US011373339B2

(12) United States Patent
Graziosi et al.

(10) Patent No.: US 11,373,339 B2
(45) Date of Patent: Jun. 28, 2022

(54) PROJECTION-BASED MESH COMPRESSION

(71) Applicant: SONY CORPORATION, Tokyo (JP)

(72) Inventors: Danillo Graziosi, Flagstaff, AZ (US); Ohji Nakagami, Tokyo (JP); Alexandre Zaghetto, San Jose, CA (US); Ali Tabatabai, Cupertino, CA (US)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/161,300

(22) Filed: Jan. 28, 2021

(65) Prior Publication Data

US 2021/0295566 A1 Sep. 23, 2021

Related U.S. Application Data

(60) Provisional application No. 62/991,128, filed on Mar. 18, 2020.

(51) Int. Cl.
*G06T 9/00* (2006.01)
*G06T 17/20* (2006.01)

(52) U.S. Cl.
CPC ............ *G06T 9/001* (2013.01); *G06T 17/205* (2013.01); *G06T 2200/04* (2013.01)

(58) Field of Classification Search
None
See application file for complete search history.

(56) References Cited

U.S. PATENT DOCUMENTS

| 10,535,161 | B2 | 1/2020 | Budagavi et al. |
| 2007/0291031 | A1* | 12/2007 | Konev ............... G06T 17/20 345/423 |
| 2012/0262444 | A1* | 10/2012 | Stefanoski ......... G06T 9/001 345/419 |
| 2015/0009214 | A1* | 1/2015 | Lee .................. G06T 17/20 345/420 |
| 2015/0193718 | A1* | 7/2015 | Shaburov ......... G06Q 10/06395 705/7.39 |
| 2016/0086353 | A1 | 3/2016 | Lukac et al. |

(Continued)

OTHER PUBLICATIONS

Danhang Tang, et al. "Real-time Compression and Streaming of 4D Performances," ACM Trans. Graph., vol. 37, No. 6, Article 256. Publication date: Nov. 2018.

*Primary Examiner* — Sultana M Zalalee
(74) *Attorney, Agent, or Firm* — Haverstock & Owens, A Law Corporation

(57) ABSTRACT

A method of compressing untracked and tracked meshes using a projection-based approach, and leveraging the tools and syntax already generated for projection-based point cloud compression is described herein. Similar to the V-PCC approach, the mesh is segmented into surface patches, where a difference is that the segments follow the connectivity of the mesh. Each surface patch (or 3D patch) is then projected to a 2D patch, whereby in the case of the mesh, the triangle surface sampling is similar to a common rasterization approach used in computer graphics. For each patch, the position of the projected vertices is kept in a list, along with the connectivity of those vertices. The sampled surface resembles a point cloud and is coded with the same approach used for point cloud compression. Additionally, the list of vertices and connectivity is encoded per patch, and the data is sent along with the coded point cloud data.

21 Claims, 14 Drawing Sheets

(56) References Cited

U.S. PATENT DOCUMENTS

| | | | |
|---|---|---|---|
| 2017/0221263 A1* | 8/2017 | Wei | G06T 15/04 |
| 2018/0082465 A1* | 3/2018 | Surti | G06T 15/005 |
| 2018/0089899 A1* | 3/2018 | Piemonte | G06T 15/205 |
| 2019/0088014 A1* | 3/2019 | Richards | G06T 19/00 |
| 2020/0082639 A1* | 3/2020 | Parsons | G06T 17/20 |
| 2020/0211230 A1* | 7/2020 | Zhao | G06T 15/04 |
| 2020/0294271 A1* | 9/2020 | Ilola | G06T 15/08 |
| 2020/0327719 A1* | 10/2020 | Mason | G06T 15/08 |
| 2020/0410753 A1* | 12/2020 | Molyneaux | G06T 19/006 |

* cited by examiner

| nal_unit_header | atlas_tile_group_layer_rbsp | pdu_num_faces[ patchIndex ] | pdu_num_vertices[ patchIndex ] | ••• | for( i=0; i<pdu_num_faces[ patchIdx]; i++ ) { | pdu_face_vertex[ patchIndex ][ i ][0/1/2] | for( i=0; i<pdu_num_vertices[ patchIdx]; i++ ) { | pdu_vertex_pos[ patchIndex ][ i ][0/1] | ••• |

Fig. 5

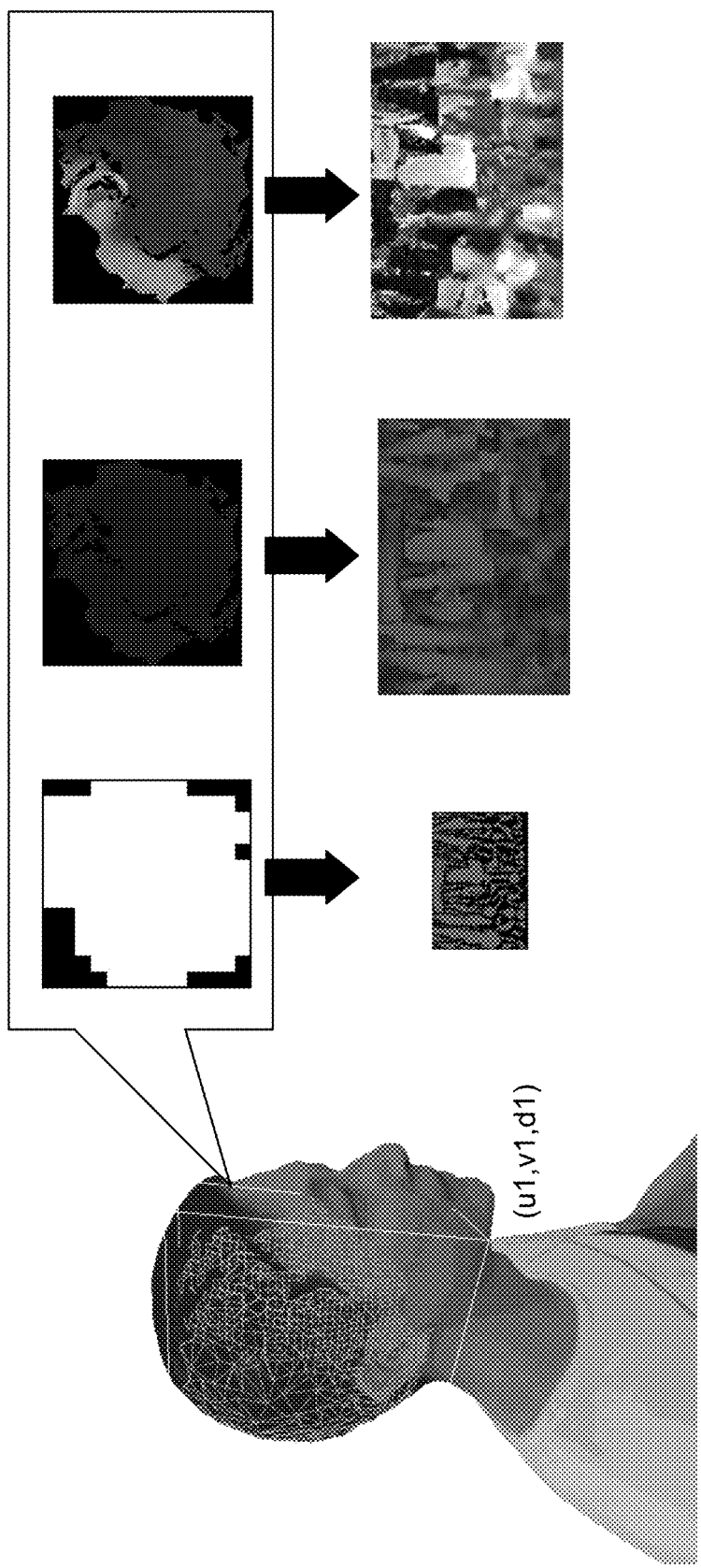

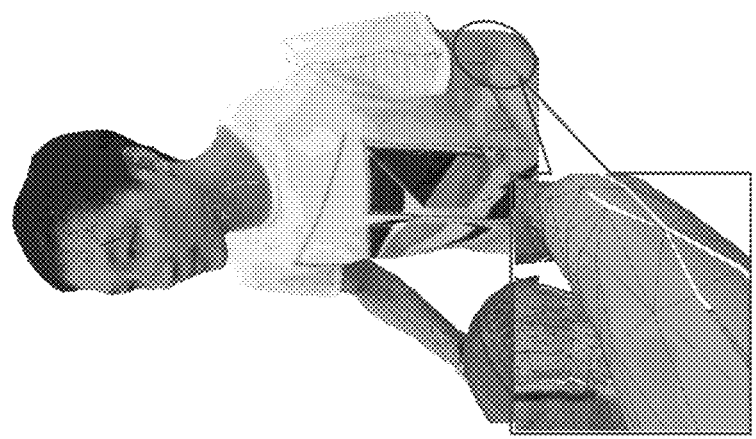
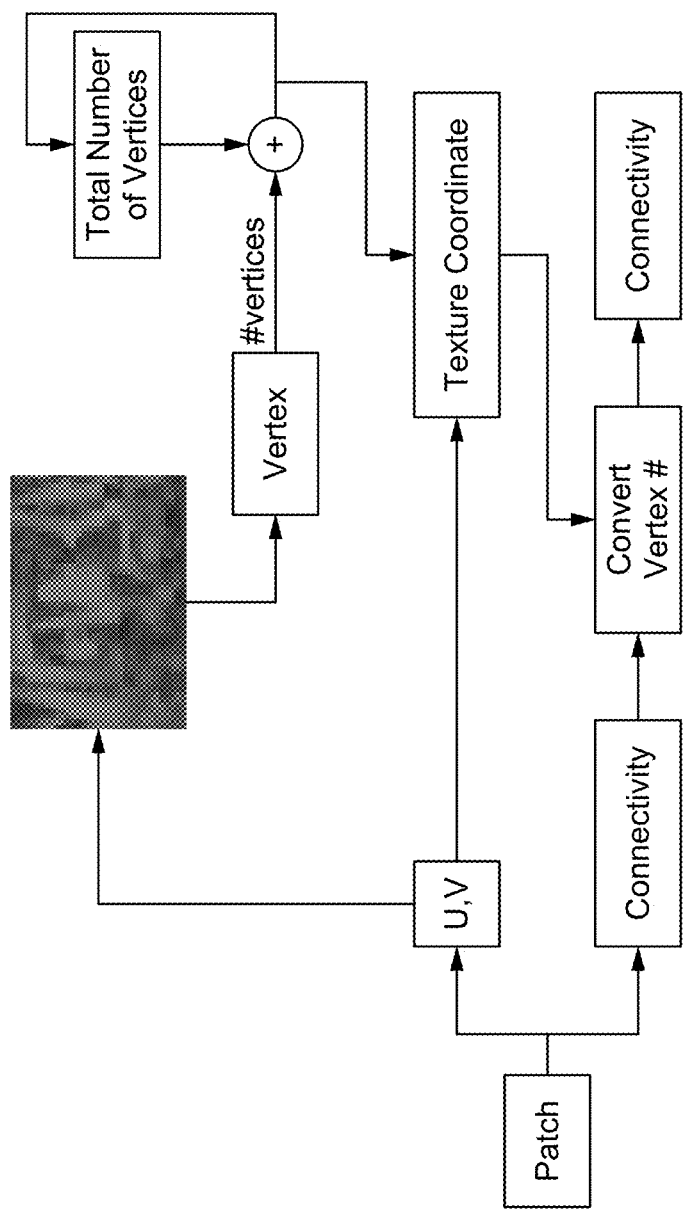
Fig. 9

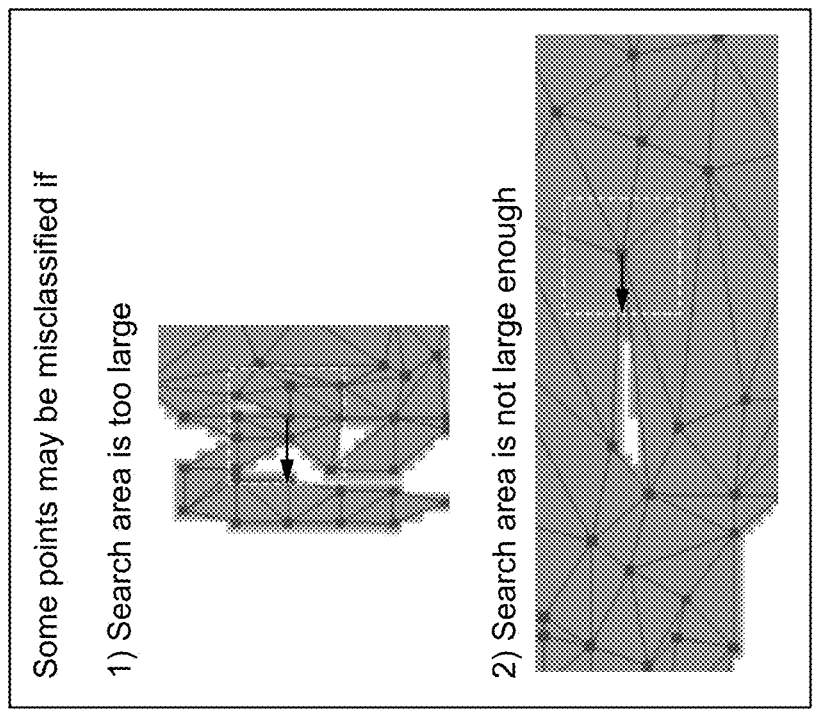
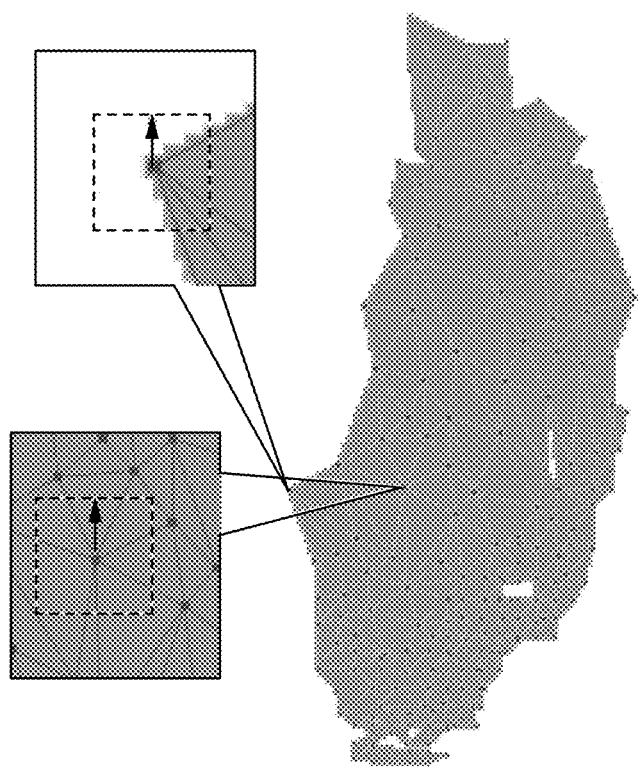
Fig. 11

PROJECTION-BASED MESH COMPRESSION

CROSS-REFERENCE TO RELATED APPLICATION(S)

This application claims priority under 35 U.S.C. § 119(e) of the U.S. Provisional Patent Application Ser. No. 62/991,128, filed Mar. 18, 2020 and titled, "PROJECTION-BASED MESH COMPRESSION," which is hereby incorporated by reference in its entirety for all purposes.

FIELD OF THE INVENTION

The present invention relates to three dimensional graphics. More specifically, the present invention relates to coding of three dimensional graphics.

BACKGROUND OF THE INVENTION

Recently, a novel method to compress point clouds based on projection from 3D to 2D is being standardized. The method, also known as V-PCC (video-based point cloud compression), maps the 3D point cloud data into several 2D patches, and then further arranges the patches into an atlas image, which is subsequently encoded with a video encoder. The atlas images correspond to the geometry of the points, the respective texture, and an occupancy map that indicates which of the positions are to be considered for the point cloud reconstruction.

In 2017, MPEG had issued a call for proposal (CfP) for compression of point clouds. After evaluation of several proposals, currently MPEG is considering two different technologies for point cloud compression: 3D native coding technology (based on octree and similar coding methods), or 3D to 2D projection, followed by traditional video coding. In the case of dynamic 3D scenes, MPEG is using a test model software (TMC2) based on patch surface modeling, projection of patches from 3D to 2D image, and coding the 2D image with video encoders such as HEVC. This method has proven to be more efficient than native 3D coding, and is able to achieve competitive bitrates at acceptable quality.

Due to the success for coding 3D point clouds of the projection-based method (also known as the video-based method, or V-PCC), the standard is expected to include in future versions further 3D data, such as 3D meshes. However, the current version of the standard is only suitable for the transmission of an unconnected set of points, so there is no mechanism to send the connectivity of points, as it is required in 3D mesh compression.

Methods have been propose to extend the functionality of V-PCC to meshes as well. One possible way is to encode the vertices using V-PCC, and then the connectivity using a mesh compression approach, such as TFAN or Edgebreaker. The limitation of this method is that the original mesh has to be dense, so that the point cloud generated from the vertices is not sparse, and can be efficiently encoded after projection. Moreover, the order of the vertices affect the coding of connectivity, and different methods to reorganize the mesh connectivity have been proposed. An alternative way to encode a sparse mesh is to use the RAW patch data to encode the vertices position in 3D. Since RAW patches encode (x,y,z) directly, in this method all the vertices are encoded as RAW data, while the connectivity is encoded by a similar mesh compression method, as mentioned before. In the RAW patch, the vertices may be sent in any preferred order, so the order generated from connectivity encoding can be used. The method can encode sparse point clouds, however, RAW patches are not efficient to encode 3D data, and further data such as the attributes of the triangle faces may be missing from this approach.

SUMMARY OF THE INVENTION

A method of compressing untracked and tracked meshes using a projection-based approach, and leveraging the tools and syntax already generated for projection-based point cloud compression is described herein. Similar to the V-PCC approach, the mesh is segmented into surface patches, where a difference is that the segments follow the connectivity of the mesh. Each surface patch (or 3D patch) is then projected to a 2D patch, whereby in the case of the mesh, the triangle surface sampling is similar to a common rasterization approach used in computer graphics. For each patch, the position of the projected vertices is kept in a list, along with the connectivity of those vertices. The sampled surface resembles a point cloud and is coded with the same approach used for point cloud compression. Additionally, the list of vertices and connectivity is encoded per patch, and the data is sent along with the coded point cloud data.

In one aspect, a method programmed in a non-transitory memory of a device. The method comprises performing mesh voxelization on an input mesh, implementing patch generation which segments the mesh into patches including a rasterized mesh surface and vertices location and connectivity information, generating a video-based point cloud compression (V-PCC) image from the rasterized mesh surface, implementing base-mesh coding with the vertices location and connectivity information and generating a V-PCC bitstream based on the V-PCC image and the base-mesh coding, wherein the V-PCC bitstream includes information for point cloud reconstruction and mesh reconstruction. Mesh voxelization includes shifting and/or scaling mesh values to avoid negative values and non-integer values. Mesh voxelization includes finding a lowest vertex value below zero and shifting the mesh values so the lowest vertex value is above zero. Implementing patch generation includes: calculating a normal per triangle, wherein calculating the normal of the triangle includes using a cross-product between edges, categorizing triangles according to the normals, and implementing a refinement process by analyzing neighboring triangles. The method further comprises displaying content partially comprising a point cloud and partially comprising a mesh. Delta position information of tracked vertices is included in the bitstream. The method further comprises implementing zippering including: classifying vertices as bordering vertices or non-bordering vertices, determining neighbors of the bordering vertices and merging the neighboring bordering vertices.

In another aspect, an apparatus comprises a non-transitory memory for storing an application, the application for: performing mesh voxelization on an input mesh, implementing patch generation which segments the mesh into patches including a rasterized mesh surface and vertices location and connectivity information, generating a video-based point cloud compression (V-PCC) image from the rasterized mesh surface, implementing base-mesh coding with the vertices location and connectivity information and generating a V-PCC bitstream based on the V-PCC image and the base-mesh coding, wherein the V-PCC bitstream includes information for point cloud reconstruction and mesh reconstruction and a processor coupled to the memory, the processor configured for processing the application. Mesh voxelization includes shifting and/or scaling mesh values to avoid negative values and non-integer values. Mesh voxelization includes finding a lowest vertex value below zero and shifting the mesh values so the lowest vertex value is above zero. Implementing patch generation includes: calculating a normal per triangle, wherein calculating the normal of the triangle includes using a cross-product between edges, categorizing triangles according to the normals, and implementing a refinement process by analyzing neighboring triangles. The apparatus wherein the application is further configured for displaying content partially comprising a point cloud and partially comprising a mesh. Delta position information of tracked vertices is included in the bitstream. The apparatus wherein the application is further configured for implementing zippering including: classifying vertices as bordering vertices or non-bordering vertices, determining neighbors of the bordering vertices and merging the neighboring bordering vertices.

In another aspect, a system comprises one or more cameras for acquiring three dimensional content and an encoder for encoding the three dimensional content by: performing mesh voxelization on an input mesh of the three dimensional content, implementing patch generation which segments the mesh into patches including a rasterized mesh surface and vertices location and connectivity information, generating a video-based point cloud compression (V-PCC) image from the rasterized mesh surface, implementing base-mesh coding with the vertices location and connectivity information and generating a V-PCC bitstream based on the V-PCC image and the base-mesh coding, wherein the V-PCC bitstream includes information for point cloud reconstruction and mesh reconstruction. Mesh voxelization includes shifting and/or scaling mesh values to avoid negative values and non-integer values. Mesh voxelization includes finding a lowest vertex value below zero and shifting the mesh values so the lowest vertex value is above zero. Implementing patch generation includes: calculating a normal per triangle, wherein calculating the normal of the triangle includes using a cross-product between edges, categorizing triangles according to the normals, and implementing a refinement process by analyzing neighboring triangles. The encoder is further configured for displaying content partially comprising a point cloud and partially comprising a mesh. Delta position information of tracked vertices is included in the bitstream. The encoder is further configured for implementing zippering including: classifying vertices as bordering vertices or non-bordering vertices, determining neighbors of the bordering vertices and merging the neighboring bordering vertices.

BRIEF DESCRIPTION OF THE DRAWINGS

FIG. 5 illustrates a data structure for base-mesh coding/signaling according to some embodiments.

FIG. 8 illustrates a diagram of V-PCC image generation according to some embodiments.

FIG. 9 illustrates a diagram of mesh reconstruction according to some embodiments.

FIG. 11 illustrates a diagram of classifying vertices as border or non-border according to some embodiments.

DETAILED DESCRIPTION OF THE PREFERRED EMBODIMENT

A method of compressing untracked and tracked meshes using a projection-based approach, and leveraging the tools and syntax already generated for projection-based point cloud compression is described herein. Untracked meshes are where every frame has a different mesh and different connectivity. Tracked meshes have a first frame with a mesh and then that mesh is tracked, and the structure of the mesh is kept the same and its position changes with time. Similar to the V-PCC approach, the mesh is segmented into surface patches, where a difference is that the segments follow the connectivity of the mesh. Each surface patch (or 3D patch) is then projected to a 2D patch, whereby in the case of the mesh, the triangle surface sampling is similar to a common rasterization approach used in computer graphics. For each patch, the position of the projected vertices is kept in a list, along with the connectivity of those vertices. The sampled surface resembles a point cloud and is coded with the same approach used for point cloud compression. Additionally, the list of vertices and connectivity is encoded per patch, and the data is sent along with the coded point cloud data.

Two new syntax elements are introduced to describe the mesh information: a mesh patch data unit, and a tracked mesh patch data unit. The mesh patch data unit is able to indicate the vertex positions and their respective connectivity. Alternatively, the position of the vertices is allowed to be sent via an occupancy map and not via patch data. For the case of tracked meshes, syntax elements are introduced that are able to transmit two typical motions in the case of tracked meshes: global motion and a surface motion. The tracked mesh patch data unit syntax elements represent the global motion via translations and rotations of the patch, while the surface motion (e.g., cloth wrinkle motion) is represented by the vertices displacement.

One could interpret the additional connectivity data as a base mesh that is generated for each patch, giving the decoder the flexibility to use this additional data or not. The syntax also allows the encoder to mix content, and have point clouds and meshes co-existing (for example, one may wish to use point clouds for finer structures such as hair, but meshes for flat surfaces), and even point clouds with tracked and untracked meshes (for example, parts of the surface that are difficult to track are able to be sent as untracked, or even tracked parts that deform too much are able to be hidden by point cloud layers). This data is able to be used to improve rendering and in point filtering algorithms. Moreover, the mesh is encoded with the same principle of projection-based compression, which leads to a better integration with the current V-PCC approach of projection-based coding of point clouds.

Figure 1:
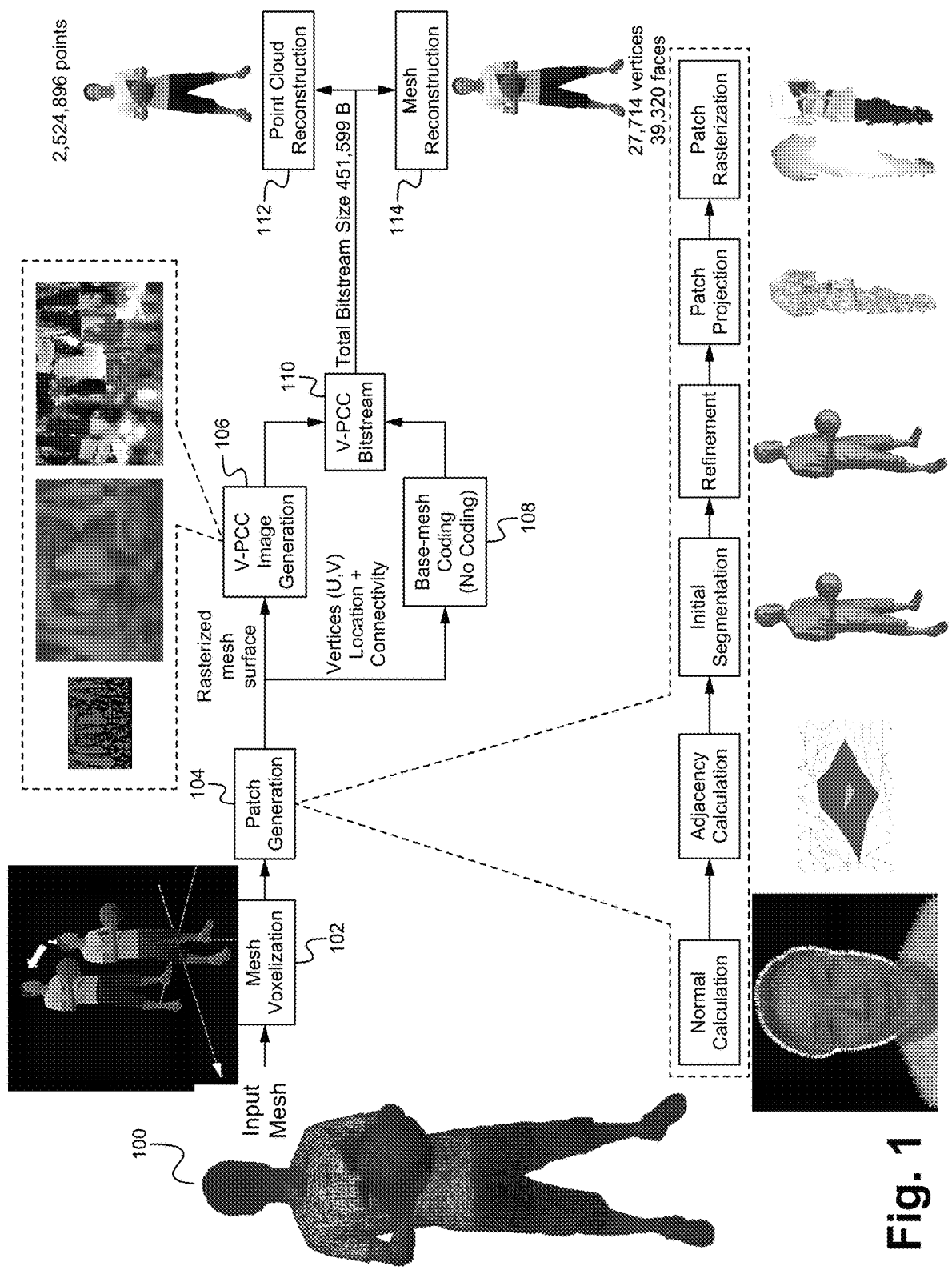
FIG. 1 illustrates a flowchart of a method of implementing projection-based mesh compression according to some embodiments.

FIG. 1 illustrates a flowchart of a method of implementing projection-based mesh compression according to some embodiments. In the step 100, an input mesh is received or acquired. For example, the input mesh is downloaded (e.g., from a network device) or acquired/captured by a device (e.g., camera or autonomous vehicle).

In the step 102, mesh voxelization is performed. The mesh is able to have positions of vertices in floating point, so these positions are converted to the integer space. V-PCC assumes a voxelized point cloud.

In the step 104, patch generation (or creation) is implemented. Patch generation includes: normal calculation, adjacency calculation, initial segmentation; refinement, patch projection, and patch rasterization. Normal calculation is calculating the normals of each triangle (e.g., cross product of the triangle's edges). Adjacency calculation involves calculating each triangle's adjacency (e.g., which triangles in the mesh neighbor or touch the current triangle or other triangles). Initial segmentation includes classifying the normal according to the orientation. For example, a normal of a triangle is able to point up, down, left, right, front, or back, and is able to be classified based on the direction/orientation. In some embodiments, the triangles are color-coded based on the orientation of their normals (e.g., all of the triangles with a normal pointing up are colored green). Refinement involves locating outliers (e.g., a single red triangle surrounded by blue triangles) and smoothing out the outliers (e.g., changing the single red triangle to match its neighbors which are blue). The refinement is performed by analyzing the neighbors and smoothing the orientation (e.g., adjusting the orientation of the normal). Once there is a smooth surface, then patch projection is performed which involves projecting the patches for a specific classification of triangles (e.g., based on orientation). With the projection, the vertices and connectivity are shown on the patches. For example, the body and face in this example are separate projections since there are triangles with different classifications separating the two. V-PCC does not understand this though; rather, V-PCC understand points, so the projection is rasterized (e.g., sampling points on the surface including the distance of the points to generate a geometry image and the attributes of the surface). The rasterized mesh surface is very similar to a V-PCC image.

Patch generation results in a rasterized mesh surface and vertices locations and connectivity. The rasterized mesh surface is utilized in V-PCC image generation/creation, in the step 106. The vertices locations and connectivity are used for base-mesh coding, in the step 108. In the step 110, the V-PCC bitstream is generated from the generated V-PCC image and the base-mesh coding. In some embodiments, the base-mesh coding does not involve any additional coding, and the vertices locations and connectivity go directly to the V-PCC bitstream.

The V-PCC bitstream enables point cloud reconstruction, in the step 112, and/or mesh construction, in the step 114. The point cloud and/or the mesh are able to be extracted from the V-PCC bitstream, which provides significant flexibility. In some embodiments, fewer or additional steps are implemented. In some embodiments, the order of the steps is modified.

Figure 2:
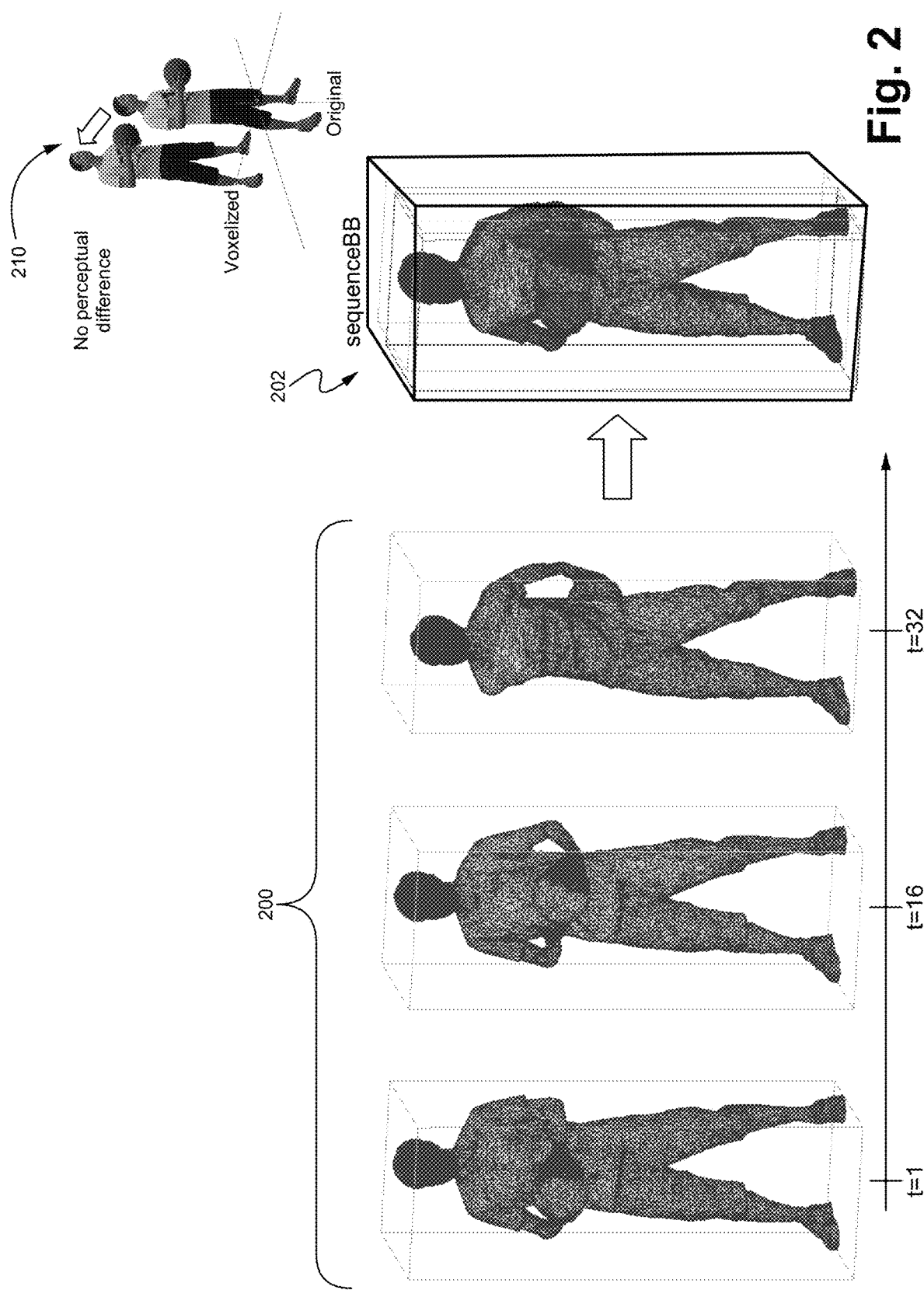
FIG. 2 illustrates a diagram of mesh voxelization according to some embodiments.

FIG. 2 illustrates a diagram of mesh voxelization according to some embodiments. Each frame has a different bounding box. The bounding box of each frame is obtained (e.g., frames 200 at t=1, t=16 and t=32). Then, the sequence bounding box 202 is calculated from the many bounding boxes, sequenceBB=(minPoint, maxPoint). The sequence bounding box 202 contains all of the vertices, regardless of the frame. The scale to fit the maximum range in the range defined by the bitdepth is calculated, maxRange=max(maxPoint[0 . . . 2]-minPoint[0 . . . 2]), scale=($2^{bitdepth}-1$)/maxRange. The result is scaled and shifted by the minimum value, voxelizedpoint=floor(scale*originalPoint+minPoint). The scale and shift amounts are able to be user-defined or computer generated based on a learning algorithm (e.g., by analyzing the bounding box and automatically calculating the scale and shift amounts).

In some embodiments, mesh voxelization involves converting floating point values of the positions of points of the input mesh to integers. The precision of the integers is able to be set by a user or automatically. In some embodiments, mesh voxelization includes shifting values so there are no negative numbers.

For example, an original mesh is below the axis line, resulting in negative numbers. Via mesh voxelization, the mesh is shifted and/or scaled to avoid negative values and non-integer values. In one implementation, the lowest vertex value below zero is found, and then the values are able to be shifted such that the lowest vertex value is above zero. In some embodiments, the range of values is fit into a specified bitrange (e.g., by scaling) such as 11 bits.

The voxelized mesh 210 is the original mesh after scaling and shifting. For example, the voxelized mesh 210 is the original mesh after it has grown and has been shifted so that it is only positive values, which is better for encoding in some instances.

Figure 3:
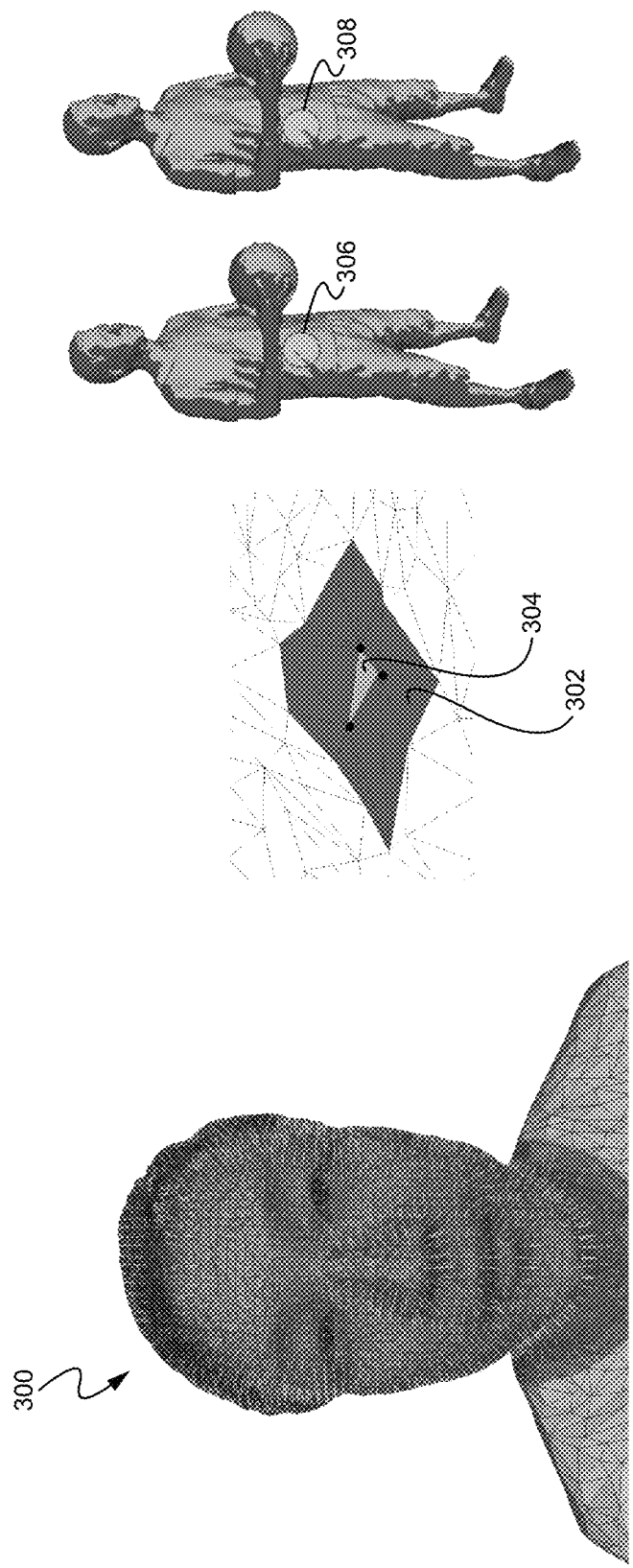
FIG. 3 illustrates a diagram of patch generation according to some embodiments.

FIG. 3 illustrates a diagram of patch generation according to some embodiments. As described, patch generation involves normal calculation, adjacency calculation, initial segmentation and segmentation refinement. Calculating a normal of each triangle involves the cross-product between triangle edges. The normals are able to be represented as arrows or spikes as shown in image 300. Adjacency calculation is determining if triangles share a vertex, and if so, the triangles are neighbors. As shown in the Figure, all of the gray triangles 302 are neighbors of the white triangle 304 in the middle. Initial segmentation and segmentation refinement are performed the same as V-PCC by analyzing the orientation of the normals, classifying the orientations of the normals (e.g., up, down, left, right, forward, backward), and determining if an orientation of a normal is classified differently than neighboring normals that are all classified the same (e.g., a first patch is classified as up 306, while most or all of the neighboring patches are classified as forward), then changing the classification of the normal of the patch to match the neighbors' orientations (e.g., first patch classification is changed to forward 308).

As described, patch generation is implemented which segments the mesh into patches. Patch generation also generates 1) a rasterized mesh surface and 2) vertices location and connectivity information. The rasterized mesh surface is a set of points which go through the V-PCC image generation and is encoded as a V-PCC image. The vertices location and connectivity information is received for base-mesh coding.

Patch generation described herein is similar to patch generation in V-PCC. However, instead of calculating the normal per point, the normal per triangle is calculated. The normal per triangle is calculated using the cross-product between the edges to determine a normal vector. Then, the triangles are categorized according to the normals. For example, the normals are divided into n (e.g., 6) categories such as front, back, top, down, left and right. The normals are indicated in different colors to show the initial segmentation. FIG. 3 shows the different colors in grayscale such as the black and light gray as different colors indicating different normals. Although it may be difficult to see, top surfaces (e.g., the top of the person's head, the top of the ball and the top of the sneakers) are one color (e.g., green), a first side of the person/ball is very dark, representing another color (e.g., red), the bottom of the ball is another color (e.g., purple), and the front of the person and ball, which is mostly light gray, represents another color (e.g., cyan).

By multiplying the product of the normal by the directions, the main direction is able to be found. By looking at neighboring triangles, a smoothing/refinement process is able to be implemented. For example, if the number of neighboring triangles above a threshold are all blue, then this triangle also be classified as blue, even if there was an anomaly which initially indicated the triangle was red.

Connected components of triangles are generated to identify which of the triangles have the same color (e.g., triangles with the same category sharing at least one vertex).

Connectivity information describes how the points are connected in 3D. These connections together generate triangles (to be more specific, 3 distinct connections that share 3 points), which consequently generate surfaces (described by a collection of triangles). Although triangles are described herein, other geometric shapes are also allowed (e.g., rectangles).

Colors are able to be used to encode the connectivity by identifying the triangles with different colors. Each triangle, identified by three connections, is coded with a unique color.

Figure 4:
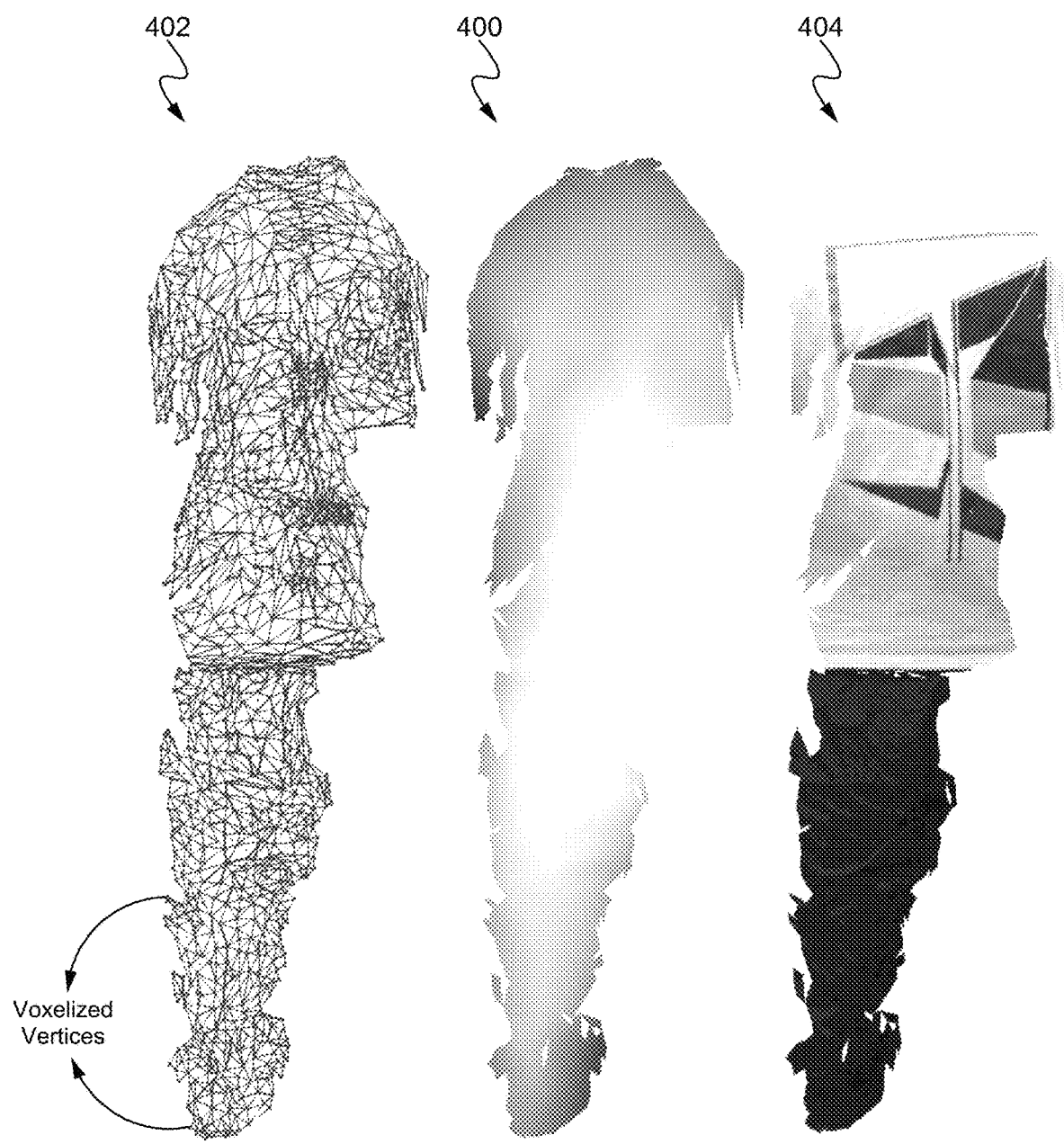
FIG. 4 illustrates a diagram of patch generation involving patch projection and patch rasterization according to some embodiments.

FIG. 4 illustrates a diagram of patch generation involving patch projection and patch rasterization according to some embodiments. Patch projection includes generating components of triangles. All triangles that are connected by at least one vertex (e.g., adjacent) and that are in the same classification are grouped together as one patch.

Patch projection also includes projecting each triangle to the patch on a canvas. If the projected position of a vertex is already occupied, the triangle is coded in another patch, so the triangle goes to a missing triangles list, to be processed again later.

If the triangle generates a bounding box that results in depth values above the maximum allowed depth, then the values are not projected and also go to the missing triangle list.

Patch rasterization includes rasterizing the projected triangles to generate the points for the point cloud representation (geometry and attribute). This loop of patch projection and patch rasterization occurs until all of the triangles are projected.

After all of the triangles are projected, the triangles in the missing triangle list are put together as patches, and projection is attempted again for them into new patches.

By projecting the mesh on a 2D surface, the area covered by the projection of a triangle is also determined by the collection of pixels. If the grouped pixels are coded with different colors, the triangles can be identified by the different colors in the image. Once the triangles are known, the connectivity can be obtained by just identifying the three connections that form the triangle.

Each triangle is projected to the patch. If the projected position of a vertex is already occupied, the triangle is coded in another patch, so it goes to a missing triangles list to be processed again later. Alternatively, maps are able to be used to identify the vertices that overlap and still be able to represent the triangle with overlapped vertices. In another alternative, points are able to be segregated into separate layers (e.g., one set of points in one layer and a second set of points in a second layer).

Image 400 shows a blank patch with triangles in the same classification connected by at least one vertex. Image 402 shows the patch with the triangles showing vertices and connectivity. Image 404 shows the patch with attribute information.

FIG. 5 illustrates a data structure for base-mesh coding/signaling according to some embodiments. Regarding base-mesh signaling, packet and atlas streams are used for the metadata associated with the video sequences. The metadata is added by adding the location of the vertices in 2D space.

The data structure includes a header, a tile group layer, and patch information such as number of faces, number of vertices, a list that goes from 0 to the number of faces with face information, and a list that goes from 0 to the number of vertices with vertex information. The vertex information is their position in the 2D space. With the lists, a mesh is able to be reconstructed from the point cloud. By transmitting the vertex list and connectivity information the transmission is able to be executed without any compression. In some embodiments, to utilize compression, TFAN or Edgebreaker are able to be used to encode patch connectivity. In some embodiments, parallelogram prediction for vertices is able to be used. In some embodiments, DPCM encoding is implemented. In some embodiments, the vertex list is encoded using the occupancy map (e.g., by including a flag to indicate whether a point is present and using a flag to indicate if the point is a vertex).

A list of points in a patch are the vertices of the triangles, and connectivity of the mesh is the same even after projection.

Connectivity is encoded (e.g., based on color codes). In some embodiments, a list of integer values is encoded. Differential Pulse Code Modulation (DPCM) in the list is able to be used. In some embodiments, the list is able to be refined or smart mesh-coding (e.g., Edgebreaker) is able to be implemented. In some embodiments, more sophisticated approaches are also possible (e.g., using Edgebreaker or TFAN, both of which are coding algorithms).

Extra information is able to be sent per patch. Inside each patch information, a list of connected components (e.g., vertices) and the location of the vertices in 2D space is sent. A more efficient notation could use DPCM schemes for the face and vertices, as discussed herein.

Tracked mesh patch data units are able to use the patches to indicate that the connectivity has not changed from one frame to another. This is able to be particularly useful for the tracked mesh cases, since only the delta position is sent. In the case of tracked meshes, a global motion is able to be captured by the bounding box position and rotation (newly introduced syntax elements using quaternions), and a surface motion, which is captured by the vertex motion. The number of bits to send the delta vertex information is able to be sent in the AFPS. Alternatively, the motion information is able to be sent as a homography transform.

Figure 6:
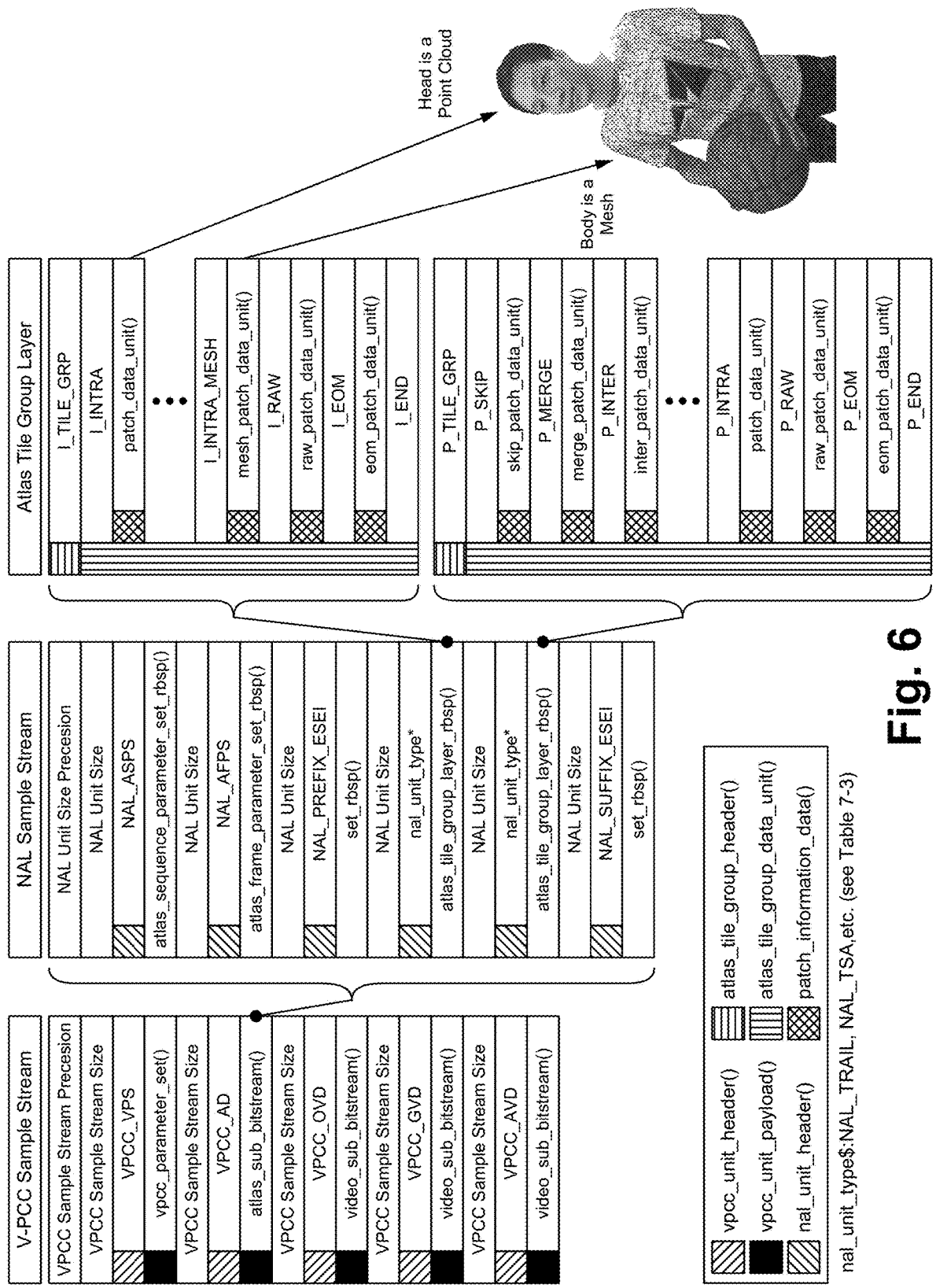
FIG. 6 illustrates an example of combining point cloud and mesh information according to some embodiments.

FIG. 6 illustrates an example of combining point cloud and mesh information according to some embodiments. As described, the point cloud and mesh information are able to be combined. For example, a point cloud only patches are able to be used for the head, while point cloud and mesh patches are used for the body.

Figure 7A:
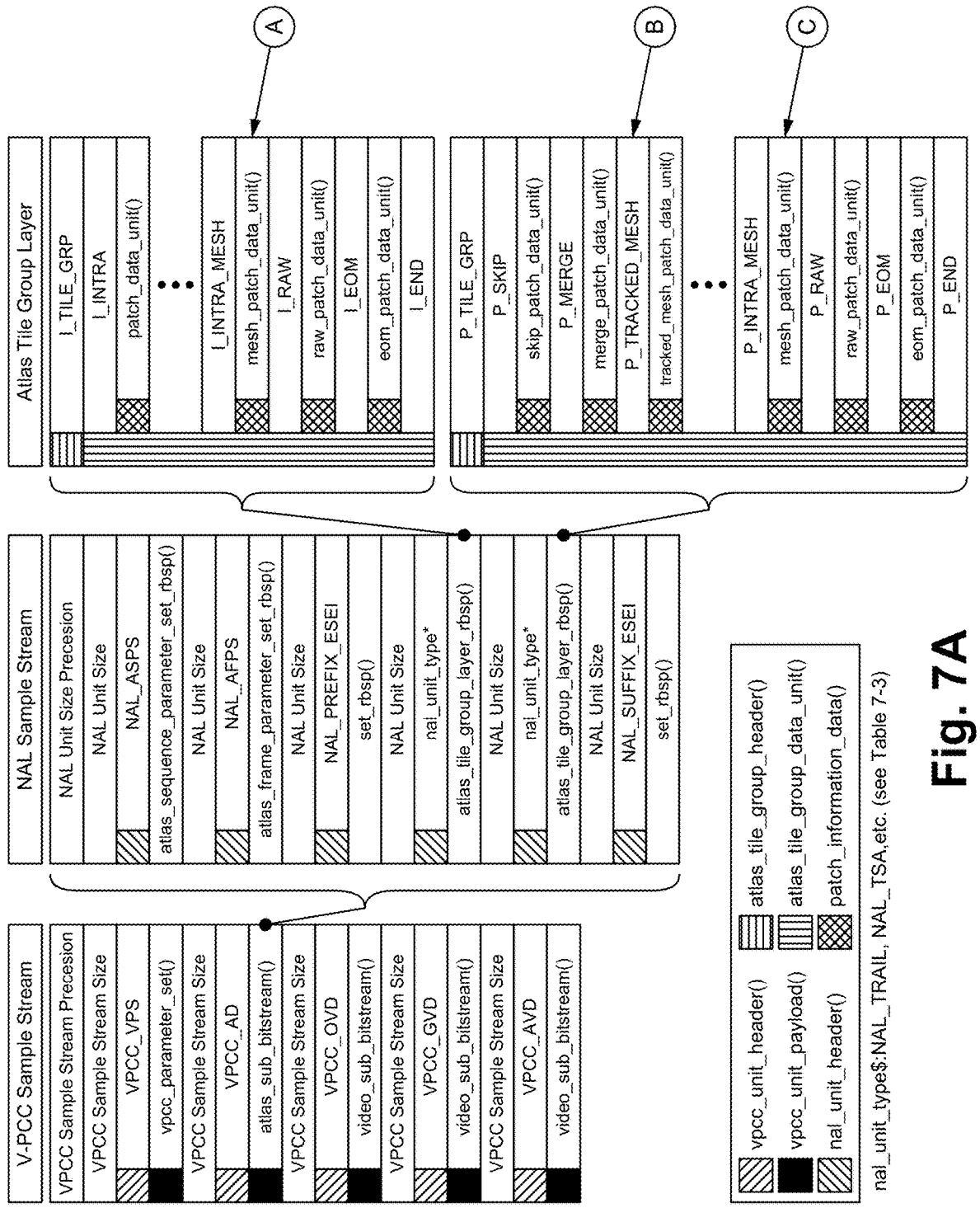
FIGS. 7A and 7B illustrate an example of combining untracked and tracked mesh information according to some embodiments.
Figure 7B:
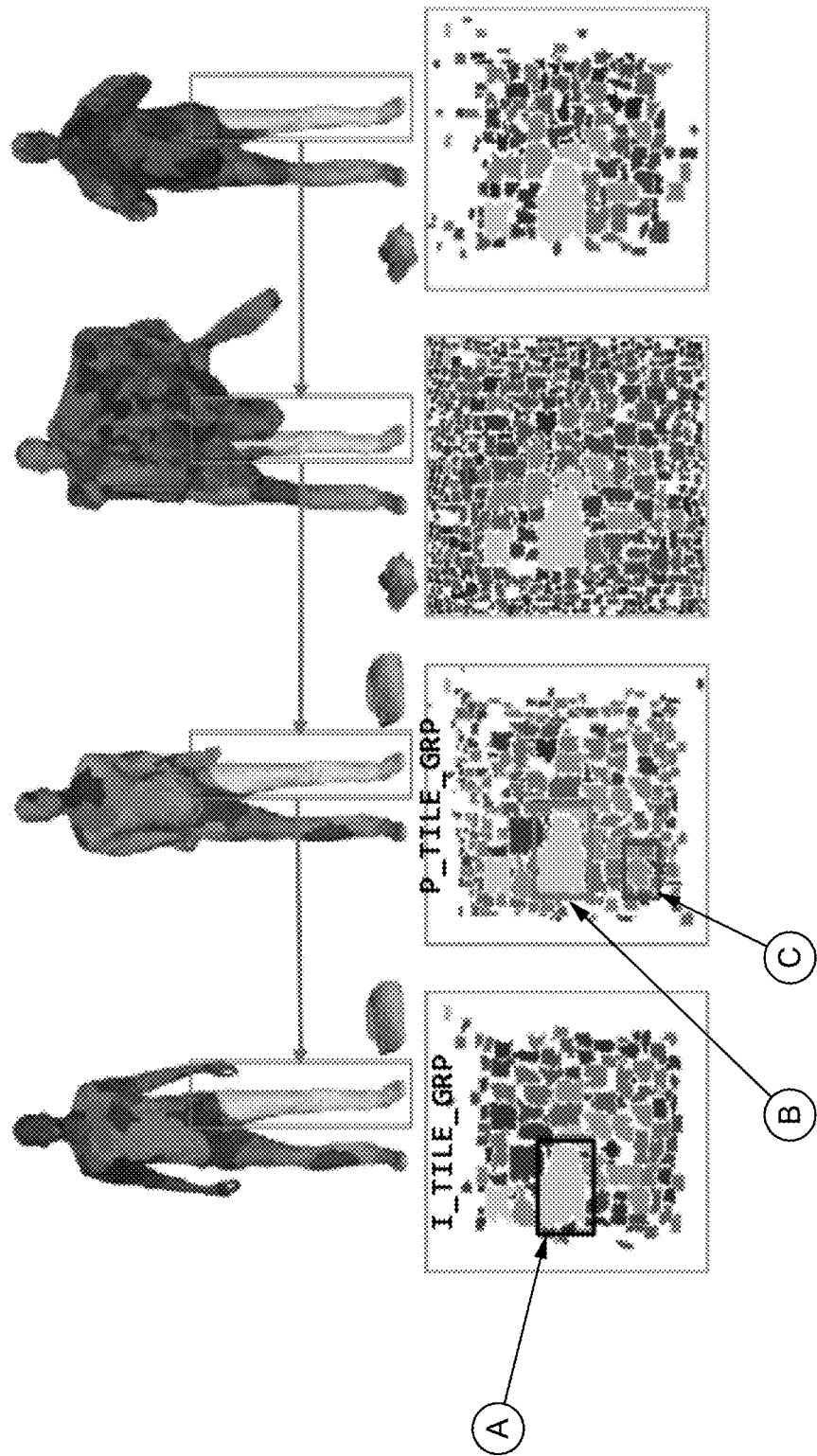

FIGS. 7A and 7B illustrate an example of combining untracked and tracked mesh information according to some embodiments. To avoid tracking issues, some implementations segment the mesh into tracked parts and untracked parts. Tracked parts are consistent in time, and are able to be represented by tracked_meshpatch_data_unit( ) while untracked parts are new each frame, and are able to be represented by mesh_patch_data_unit( ) Since point clouds are able to be mixed into the geometry as described herein, surface representation is able to be improved, for example, retaining original mesh and inserting point clouds on top of the mesh to hide the defects.

FIG. 8 illustrates a diagram of V-PCC image generation according to some embodiments. The occupancy map and geometry are generated as typically for V-PCC. The attribute map is generated from the uncompressed geometry. The attribute transfer is able to be performed using meshes.

FIG. 9 illustrates a diagram of mesh reconstruction according to some embodiments. Once the patches are generated/received, the connectivity uses new vertex numbering, but the patches are able to be added together. Each patch is similar to a mini-mesh, so all of the patches are joined together. Although there may be a vertex conversion, the patches are joined together to form a mesh. However, since some of the vertices do not match because of compression, further steps should be taken. A zippering algorithm is able to be implemented to address the issues of misaligned vertices.

Figure 10:
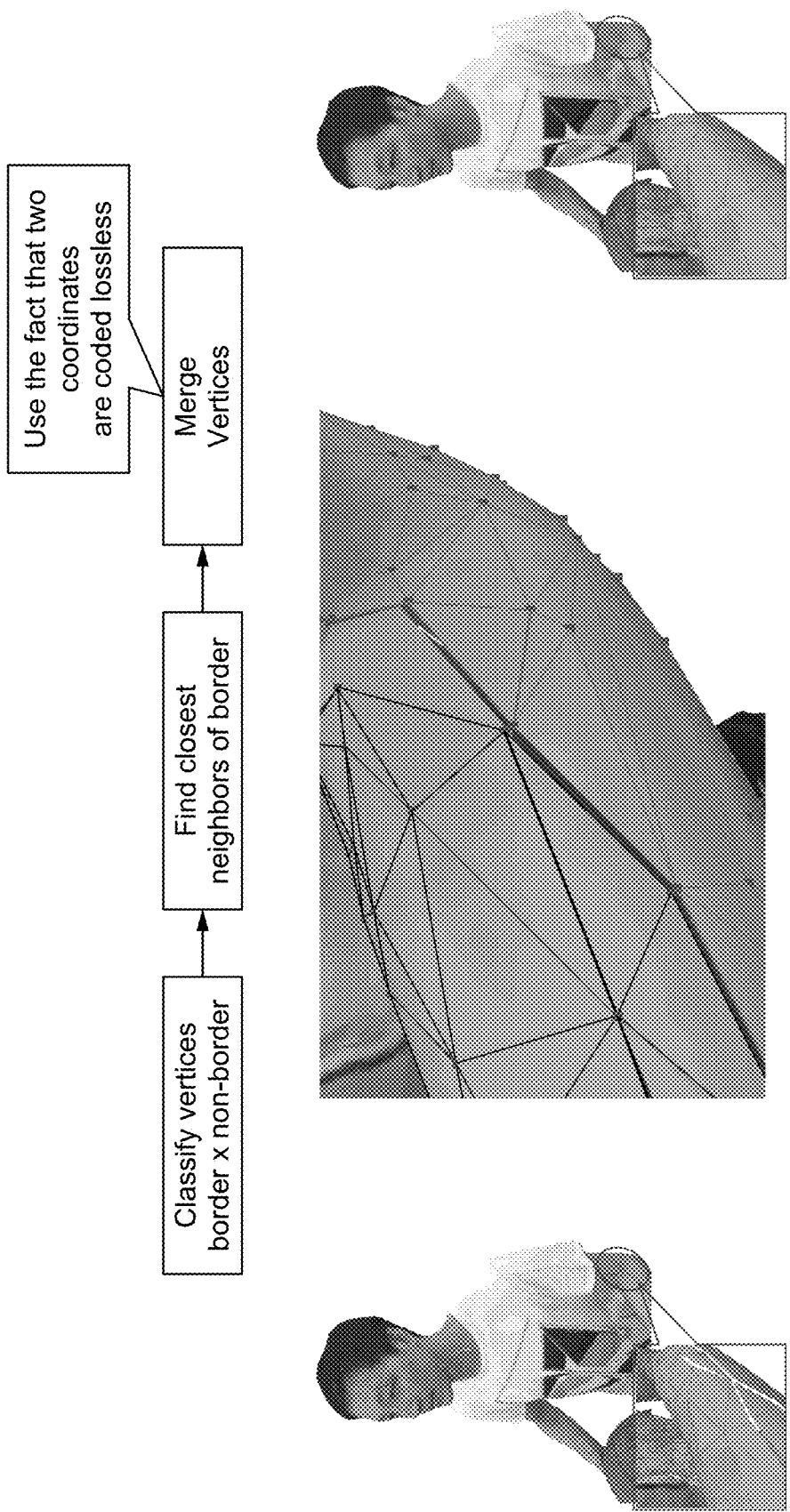
FIG. 10 illustrates a diagram of a zippering algorithm according to some embodiments.

FIG. 10 illustrates a diagram of a zippering algorithm according to some embodiments. The zippering algorithm includes classifying vertices as being border vertices and non-border vertices. Classifying is able to be performed in any manner such as determining if any other vertices connect to the vertex in a specified direction. Then, the closest neighbors of a border are determined, and the vertices of those neighboring borders are merged (e.g., put at the same position). Additionally, in V-PCC, two of the three coordinates are coded losslessly, so from x, y, z, it is known that two of the coordinates are exact, which is able to help determine points that are close. Similarly, two points are considered matched if the lines produced by varying only the normal coordinate cross each other. An adaptive method is able to be implemented: given a reference point at the border of a patch, the points are allowed to increasingly vary until they meet at least one potential candidate, the new distance will be used to modify the candidate points from other patches, and in the case of multiple matched candidates, the reference is modified to the value that generated the most number of matches. With the new modified reference, the closest border pixel from neighboring patches is searched for. If a match is found, the border vertex value is modified to the reference point, and the border vertex is removed from the list. Otherwise, a search is performed for matches in the list of non-border vertices. If a match is found, the non-border vertex value to modify the reference point.

FIG. 11 illustrates a diagram of classifying vertices as border or non-border according to some embodiments. If a vertex is connected to an open area (e.g., black area), then that vertex is a border. In another example, zero values in the occupancy map neighboring a vertex indicate the vertex is a border vertex.

Figure 12:
FIG. 12 illustrates a diagram of an alternative connectivity coding according to some embodiments.

FIG. 12 illustrates a diagram of an alternative connectivity coding according to some embodiments. Specific values are able to be used to indicate the presence of a vertex as well as the presence of an edge. For example, the image shows the occupancy map, where one of the patches contains points indicating the vertices, and black lines indicating the edges.

Figure 13:
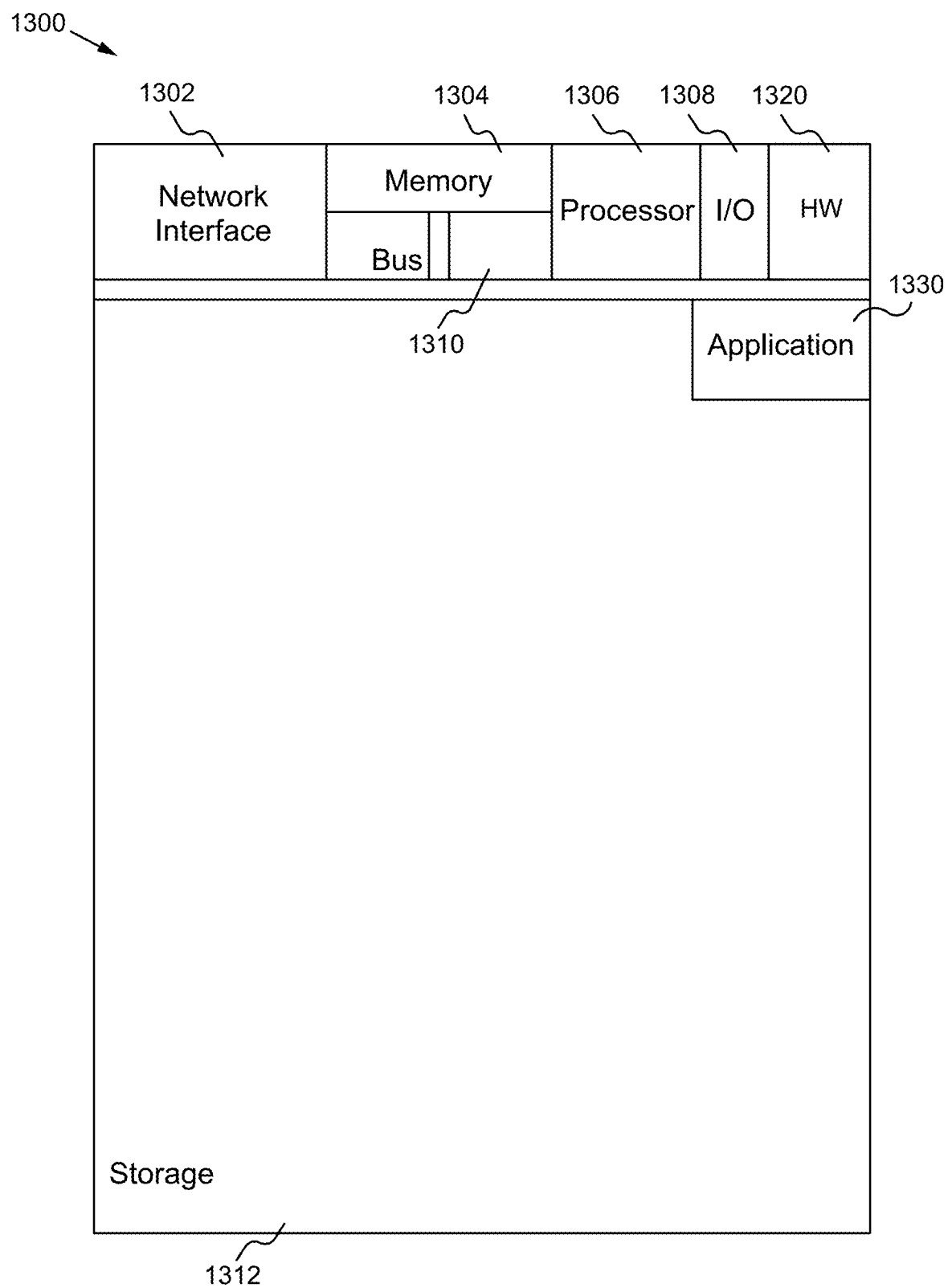
FIG. 13 illustrates a block diagram of an exemplary computing device configured to implement the projection-based mesh compression method according to some embodiments.

FIG. 13 illustrates a block diagram of an exemplary computing device configured to implement the projection-based mesh compression method according to some embodiments. The computing device 1300 is able to be used to acquire, store, compute, process, communicate and/or display information such as images and videos including 3D content. The computing device 1300 is able to implement any of the projection-based mesh compression aspects. In general, a hardware structure suitable for implementing the computing device 1300 includes a network interface 1302, a memory 1304, a processor 1306, I/O device(s) 1308, a bus 1310 and a storage device 1312. The choice of processor is not critical as long as a suitable processor with sufficient speed is chosen. The memory 1304 is able to be any conventional computer memory known in the art. The storage device 1312 is able to include a hard drive, CDROM, CDRW, DVD, DVDRW, High Definition disc/drive, ultra-HD drive, flash memory card or any other storage device. The computing device 1300 is able to include one or more network interfaces 1302. An example of a network interface includes a network card connected to an Ethernet or other type of LAN. The I/O device(s) 1308 are able to include one or more of the following: keyboard, mouse, monitor, screen, printer, modem, touchscreen, button interface and other devices. Projection-based mesh compression application(s) 1330 used to implement the projection-based mesh compression method are likely to be stored in the storage device 1312 and memory 1304 and processed as applications are typically processed. More or fewer components shown in FIG. 13 are able to be included in the computing device 1300. In some embodiments, projection-based mesh compression hardware 1320 is included. Although the computing device 1300 in FIG. 13 includes applications 1330 and hardware 1320 for the projection-based mesh compression method, the projection-based mesh compression method is able to be implemented on a computing device in hardware, firmware, software or any combination thereof. For example, in some embodiments, the projection-based mesh compression applications 1330 are programmed in a memory and executed using a processor. In another example, in some embodiments, the projection-based mesh compression hardware 1320 is programmed hardware logic including gates specifically designed to implement the projection-based mesh compression method.

In some embodiments, the projection-based mesh compression application(s) 1330 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

To utilize the projection-based mesh compression method, a device acquires or receives 3D content and processes and/or sends the content in an optimized manner to enable proper, efficient display of the 3D content. The projection-based mesh compression method is able to be implemented with user assistance or automatically without user involvement.

In operation, the projection-based mesh compression method enables more efficient and more accurate projection-based mesh compression compared to previous implementations.

In an exemplary implementation, the projection-based mesh compression described herein was implemented on top of TMC2v8.0 with one frame only and a single map. Information from the implementation includes: Bitstream stat:
Header: 16B 128b
vpccUnitSize[VPCC_VPS]: 31 B 248 b
vpccUnitSize[VPCC_AD]: 190396 B 1523168 b
vpccUnitSize[VPCC_OVD]: 29591 B 236728 b (Ocm video=29583 B)
vpccUnitSize[VPCC_GVD]: 59108 B 472864 b (Geo video=59100 B)
vpccUnitSize[VPCC_AVD]: 172441 B 1379528 b (Tex video=172433 B)
TotalMetadata: 220050 B 1760400 b
TotalGeometry: 59100 B 472800 b
TotalTexture: 172433 B 1379464 b
Total: 451583 B 1379464 b
Total bitstream size 451599 B

SOME EMBODIMENTS OF PROJECTION-BASED MESH COMPRESSION

1. A method programmed in a non-transitory memory of a device comprising:
    performing mesh voxelization on an input mesh;
    implementing patch generation which segments the mesh into patches including a rasterized mesh surface and vertices location and connectivity information;
    generating a video-based point cloud compression (V-PCC) image from the rasterized mesh surface;
    implementing base-mesh coding with the vertices location and connectivity information; and
    generating a V-PCC bitstream based on the V-PCC image and the base-mesh coding, wherein the V-PCC bitstream includes information for point cloud reconstruction and mesh reconstruction.
2. The method of clause 1 wherein mesh voxelization includes shifting and/or scaling mesh values to avoid negative values and non-integer values.
3. The method of clause 2 wherein mesh voxelization includes finding a lowest vertex value below zero and shifting the mesh values so the lowest vertex value is above zero.
4. The method of clause 1 wherein implementing patch generation includes:
    calculating a normal per triangle, wherein calculating the normal of the triangle includes using a cross-product between edges,
    categorizing triangles according to the normals, and
    implementing a refinement process by analyzing neighboring triangles.
5. The method of clause 1 further comprising displaying content partially comprising a point cloud and partially comprising a mesh.
6. The method of clause 1 wherein delta position information of tracked vertices is included in the bitstream.
7. The method of clause 1 further comprising implementing zippering including:
    classifying vertices as bordering vertices or non-bordering vertices;
    determining neighbors of the bordering vertices; and
    merging the neighboring bordering vertices.
8. An apparatus comprising:
    a non-transitory memory for storing an application, the application for:
        performing mesh voxelization on an input mesh;
        implementing patch generation which segments the mesh into patches including a rasterized mesh surface and vertices location and connectivity information;
        generating a video-based point cloud compression (V-PCC) image from the rasterized mesh surface;
        implementing base-mesh coding with the vertices location and connectivity information; and
        generating a V-PCC bitstream based on the V-PCC image and the base-mesh coding, wherein the V-PCC bitstream includes information for point cloud reconstruction and mesh reconstruction; and
    a processor coupled to the memory, the processor configured for processing the application.
9. The apparatus of clause 8 wherein mesh voxelization includes shifting and/or scaling mesh values to avoid negative values and non-integer values.
10. The apparatus of clause 9 wherein mesh voxelization includes finding a lowest vertex value below zero and shifting the mesh values so the lowest vertex value is above zero.
11. The apparatus of clause 8 wherein implementing patch generation includes:
    calculating a normal per triangle, wherein calculating the normal of the triangle includes using a cross-product between edges,
    categorizing triangles according to the normals, and
    implementing a refinement process by analyzing neighboring triangles.
12. The apparatus of clause 8 wherein the application is further configured for displaying content partially comprising a point cloud and partially comprising a mesh.
13. The apparatus of clause 8 wherein delta position information of tracked vertices is included in the bitstream.
14. The apparatus of clause 8 wherein the application is further configured for implementing zippering including:
    classifying vertices as bordering vertices or non-bordering vertices;
    determining neighbors of the bordering vertices; and
    merging the neighboring bordering vertices.
15. A system comprising:
    one or more cameras for acquiring three dimensional content; and
    an encoder for encoding the three dimensional content by:
        performing mesh voxelization on an input mesh of the three dimensional content;
        implementing patch generation which segments the mesh into patches including a rasterized mesh surface and vertices location and connectivity information;
        generating a video-based point cloud compression (V-PCC) image from the rasterized mesh surface;
        implementing base-mesh coding with the vertices location and connectivity information; and
        generating a V-PCC bitstream based on the V-PCC image and the base-mesh coding, wherein the V-PCC bitstream includes information for point cloud reconstruction and mesh reconstruction.
16. The system of clause 15 wherein mesh voxelization includes shifting and/or scaling mesh values to avoid negative values and non-integer values.
17. The system of clause 16 wherein mesh voxelization includes finding a lowest vertex value below zero and shifting the mesh values so the lowest vertex value is above zero.

18. The system of clause 15 wherein implementing patch generation includes:
   calculating a normal per triangle, wherein calculating the normal of the triangle includes using a cross-product between edges,
   categorizing triangles according to the normals, and
   implementing a refinement process by analyzing neighboring triangles.
19. The system of clause 15 further comprising displaying content partially comprising a point cloud and partially comprising a mesh.
20. The system of clause 15 wherein delta position information of tracked vertices is included in the bitstream.
21. The system of clause 15 further comprising implementing zippering including: classifying vertices as bordering vertices or non-bordering vertices;
   determining neighbors of the bordering vertices; and
   merging the neighboring bordering vertices.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method programmed in a non-transitory memory of a device comprising:
   performing mesh voxelization on an input mesh to generate a voxelized mesh including generating a plurality of bounding boxes based on triangles of the input mesh, wherein when a bounding box includes depth values above a maximum allowed depth, a corresponding triangle is added to a missing triangle list;
   implementing patch generation which segments the voxelized mesh into patches including a rasterized mesh surface and vertices location and connectivity information;
   generating a video-based point cloud compression (V-PCC) image from the rasterized mesh surface;
   implementing base-mesh coding with the vertices location and connectivity information; and
   generating a V-PCC bitstream based on the V-PCC image and the base-mesh coding, wherein the V-PCC bitstream includes information for point cloud reconstruction and mesh reconstruction.
2. The method of claim 1 wherein mesh voxelization includes shifting and/or scaling mesh vertex coordinate values to avoid negative values and non-integer values.
3. The method of claim 2 wherein mesh voxelization includes finding a lowest vertex coordinate value below zero and shifting the mesh vertex coordinate values so the lowest vertex coordinate value is above zero.
4. The method of claim 1 wherein implementing patch generation includes:
   calculating a normal per triangle, wherein calculating the normal of the triangle includes using a cross-product between edges,
   categorizing the triangles according to the normals, and
   implementing a refinement process by analyzing neighboring triangles.
5. The method of claim 1 further comprising displaying content partially comprising a point cloud and partially comprising a mesh.
6. The method of claim 1 wherein delta position information of tracked vertices is included in the bitstream.
7. The method of claim 1 further comprising implementing zippering including:
   classifying vertices as bordering vertices or non-bordering vertices;
   determining neighbors of the bordering vertices; and
   merging the neighboring bordering vertices.
8. An apparatus comprising:
   a non-transitory memory for storing an application, the application for:
      performing mesh voxelization on an input mesh to generate a voxelized mesh including generating a plurality of bounding boxes based on triangles of the input mesh, wherein when a bounding box includes depth values above a maximum allowed depth, a corresponding triangle is added to a missing triangle list;
      implementing patch generation which segments the voxelized mesh into patches including a rasterized mesh surface and vertices location and connectivity information;
      generating a video-based point cloud compression (V-PCC) image from the rasterized mesh surface;
      implementing base-mesh coding with the vertices location and connectivity information; and
      generating a V-PCC bitstream based on the V-PCC image and the base-mesh coding, wherein the V-PCC bitstream includes information for point cloud reconstruction and mesh reconstruction; and
   a processor coupled to the memory, the processor configured for processing the application.
9. The apparatus of claim 8 wherein mesh voxelization includes shifting and/or scaling mesh vertex coordinate values to avoid negative values and non-integer values.
10. The apparatus of claim 9 wherein mesh voxelization includes finding a lowest vertex coordinate value below zero and shifting the mesh vertex coordinate values so the lowest vertex coordinate value is above zero.
11. The apparatus of claim 8 wherein implementing patch generation includes:
   calculating a normal per triangle, wherein calculating the normal of the triangle includes using a cross-product between edges,
   categorizing the triangles according to the normals, and
   implementing a refinement process by analyzing neighboring triangles.
12. The apparatus of claim 8 wherein the application is further configured for displaying content partially comprising a point cloud and partially comprising a mesh.
13. The apparatus of claim 8 wherein delta position information of tracked vertices is included in the bitstream.
14. The apparatus of claim 8 wherein the application is further configured for implementing zippering including:
   classifying vertices as bordering vertices or non-bordering vertices;
   determining neighbors of the bordering vertices; and
   merging the neighboring bordering vertices.
15. A system comprising:
   one or more cameras for acquiring three dimensional content; and
   an encoder for encoding the three dimensional content by:
      performing mesh voxelization on an input mesh of the three dimensional content to generate a voxelized mesh including generating a plurality of bounding boxes based on triangles of the input mesh, wherein when a bounding box includes depth values above a maximum allowed depth, a corresponding triangle is added to a missing triangle list;

implementing patch generation which segments the voxelized mesh into patches including a rasterized mesh surface and vertices location and connectivity information;

generating a video-based point cloud compression (V-PCC) image from the rasterized mesh surface;

implementing base-mesh coding with the vertices location and connectivity information; and generating a V-PCC bitstream based on the V-PCC image and the base-mesh coding, wherein the V-PCC bitstream includes information for point cloud reconstruction and mesh reconstruction.

16. The system of claim 15 wherein mesh voxelization includes shifting and/or scaling mesh vertex coordinate values to avoid negative values and non-integer values.

17. The system of claim 16 wherein mesh voxelization includes finding a lowest vertex coordinate value below zero and shifting the mesh vertex coordinate values so the lowest vertex coordinate value is above zero.

18. The system of claim 15 wherein implementing patch generation includes:
calculating a normal per triangle, wherein calculating the normal of the triangle includes using a cross-product between edges,
categorizing the triangles according to the normals, and
implementing a refinement process by analyzing neighboring triangles.

19. The system of claim 15 wherein the encoder is further configured for displaying content partially comprising a point cloud and partially comprising a mesh.

20. The system of claim 15 wherein delta position information of tracked vertices is included in the bitstream.

21. The system of claim 15 wherein the encoder is further configured for implementing zippering including:
classifying vertices as bordering vertices or non-bordering vertices;
determining neighbors of the bordering vertices; and
merging the neighboring bordering vertices.

* * * * *